(12) United States Patent
Wang et al.

(10) Patent No.: US 8,351,791 B1
(45) Date of Patent: Jan. 8, 2013

(54) OPTICAL DEVICES WITH BUILT-IN ISOLATORS

(75) Inventors: Daoyi Wang, San Jose, CA (US); Yao Li, Fremont, CA (US); Andy Zhou, Fremont, CA (US)

(73) Assignee: Alliance Fiber Optic Products, Inc., Sunnyvale, CA (US)

( * ) Notice: Subject to any disclaimer, the term of this patent is extended or adjusted under 35 U.S.C. 154(b) by 193 days.

(21) Appl. No.: 12/858,190

(22) Filed: Aug. 17, 2010

(51) Int. Cl.
 *H04J 14/02* (2006.01)
(52) U.S. Cl. ........................................................ 398/85
(58) Field of Classification Search .................... 398/79, 398/82, 83, 85; 359/634
See application file for complete search history.

(56) References Cited

U.S. PATENT DOCUMENTS

| 7,486,891 | B1 * | 2/2009 | Yao et al. ...................... 398/85 |
| 7,912,374 | B1 * | 3/2011 | Wang et al. .................. 398/85 |

* cited by examiner

*Primary Examiner* — Jack Dinh
(74) *Attorney, Agent, or Firm* — Joe Zheng; Wuxi Sino IP Agency, Ltd

(57) ABSTRACT

New designs of optical devices, particularly for adding or dropping a selected wavelength or a group of wavelengths as well as multiplexing a plurality of signals into a multiplexed signal or demultiplexing a multiplexed signal into several signals are disclosed. According to one aspect of the present invention, an isolator core is built into the optical devices to stop a reflected signal from an optical file in the optical devices. As a result, the optical devices are amenable to small footprint, broad operating wavelength range, enhanced impact performance, lower cost, and easier manufacturing process.

14 Claims, 6 Drawing Sheets

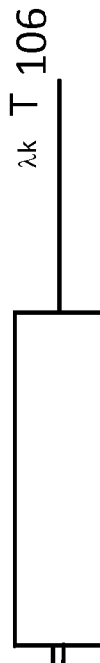
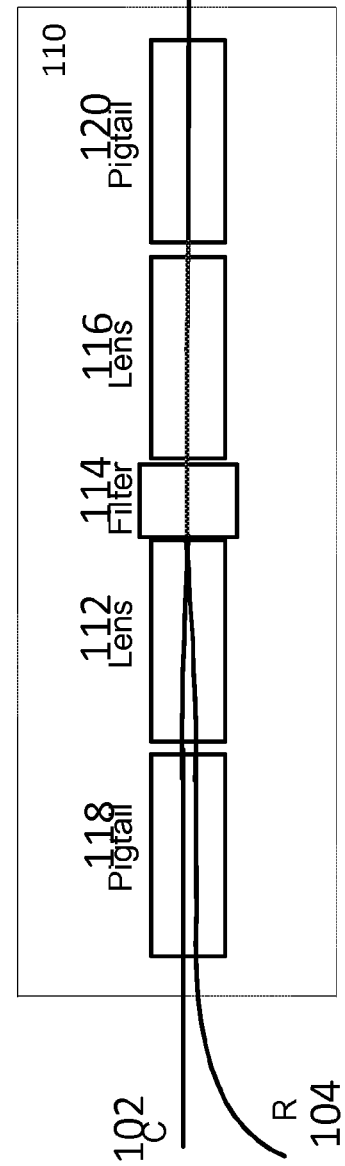

OPTICAL DEVICES WITH BUILT-IN ISOLATORS

BACKGROUND OF THE INVENTION

1. Field of the Invention

The invention is generally related to the area of optical communications. More particularly, the invention is related to optical wavelength multiplexing and add/drop devices with high reflection channel isolation and the method for making the same.

2. The Background of Related Art

The future communication networks demand ever increasing bandwidths and flexibility to different communication protocols. Fiber optic networks are becoming increasingly popular for data transmission due to their high speed and high capacity capabilities. Wavelength division multiplexing (WDM) is an exemplary technology that puts data from different sources together on an optical fiber with each signal carried at the same time on its own separate light wavelength. Using the WDM system, many separate wavelengths or channels of data can be multiplexed into a light stream transmitted on a single optical fiber. To take the benefits and advantages offered by the WDM system, there require many sophisticated optical network elements.

Optical add/drop and multiplexer/demultiplexer devices are those elements often used in optical systems and networks. For example, an exchanging of data signals involves the exchanging of matching wavelengths from two different sources within an optical network. In other words, an add/drop device can be advantageously used for the multi-channel signal for dropping a wavelength while simultaneously adding a channel with a matching wavelength at the same network node. Likewise, for transmission through a single fiber, a plurality of channel signals are combined via a multiplexer to be a multiplexed signal that eventually separated or demultiplexed via a demultiplexer.

A fundamental element in add/drop devices and multiplexer/demultiplexer is what is called a three-port device. As the name suggests, a three-port device has three ports, each for a multi-channel signal, a dropped or added signal or a multi-channel signal without the dropped or added signal. FIG. 1A shows a typical design of a three-port add/drop device 100. The optical device 100 includes a common (C) port 102, a reflection (R) port 104, and a transmission (T) port 106. When the device 100 is used as a multiplexer (i.e., to add a signal at a selected wavelength $\lambda_K$ to other signals at wavelengths other than the selected wavelength $\lambda_K$), the T-port 106 receives a light beam at the selected wavelength $\lambda_K$ that is to be multiplexed into a group of beams at wavelengths $\lambda_1, \lambda_2, \ldots \lambda_N$ excluding the selected wavelength $\lambda_K$ coupled in from the C-port 102. The R-port 104 subsequently produces a multiplexed signal including all wavelengths $\lambda_1, \lambda_2, \ldots \lambda_K, \ldots \lambda_N$.

Likewise, when the optical device 100 is used to demultiplex signals, the C-port 102 receives a group of signals with wavelengths $\lambda_1, \lambda_2, \ldots \lambda_K, \ldots \lambda_N$. The T-port 106 produces a signal with the selected wavelength $\lambda_K$ while the R-port 104 subsequently produces a group of signals including all wavelengths $\lambda_1, \lambda_2, \ldots \lambda_N$ except for the selected wavelength $\lambda_x$. In general, the optical paths towards a R-port and a T-port are respectively referred to as R-channel and T-channel.

In most occasions, however, each of the ports may reflect a certain level of signal, referred to as a noise. This back reflection signal or noise can cause signal fluctuation. Thus an in-line isolator is usually inserted to eliminate this noise. FIG. 2A shows that an isolator is inserted before a group of signals with wavelengths $\lambda_1, \lambda_2, \ldots \lambda_K, \ldots \lambda_N$ is connected to a signal C-port of a demultiplexer while FIG. 2B shows that an isolator is disposed after a group of signals with wavelengths $\lambda_1, \lambda_2, \ldots \lambda_K, \ldots \lambda_N$ is multiplexed via a multiplexer. In either case, it is noticed that the isolator is a separate device. The combination of the isolator and a multiplexer or a demultiplexer causes some problems. One of the noticeable problems is a relatively large space required to accommodate these two individual parts. Another one is the complicated procedures involved to optically align these two parts, thus incurring additional labels and costs in real installations.

Accordingly, there is a great need for techniques for providing high isolation for the optical devices such that the errors or reflection noises are minimized, and at the same time. The devices so designed are amenable to small footprint, broad operating wavelength range, enhanced impact performance, lower cost, and easier manufacturing process.

SUMMARY OF THE INVENTION

This section is for the purpose of summarizing some aspects of the present invention and to briefly introduce some preferred embodiments. Simplifications or omissions in this section as well as in the abstract and the title may be made to avoid obscuring the purpose of this section, the abstract and the title. Such simplifications or omissions are not intended to limit the scope of the present invention.

In general, the present invention pertains to improved designs of optical devices, particularly for adding or dropping a selected wavelength or a group of wavelengths as well as multiplexing a plurality of signals into a multiplexed signal or demultiplexing a multiplexed signal into several signals. For simplicity, a group of selected wavelengths or channels will be deemed or described as a selected wavelength hereinafter. According to one aspect of the present invention, a reflected light beam from an optical filter is isolated by a build-in isolator to minimize what is referred herein noise, an interface signal to the incoming signal by the reflected signal. Also a residual signal embedded in the reflected light beam is also isolated, wherein the residential signal is caused by the imperfect spectral characteristics of the optical filter. According to another aspect of the present invention, the isolator is integrated with a collimator in the optical devices. As a result, the optical devices are amenable to small footprint, broad, enhanced impact performance, lower cost, and easier manufacturing process.

The present invention may be used in many areas such as optical communications and devices. For example, devices designed in accordance with the present invention can be used in applications of fiber to home, where in both the optical network unit (ONU) in a user end, as well as the optical line termination (OLT) in the network transmission end, high isolations between the high intensity video signal and the bi-directional downstream and upstream voice/data signals are highly demanded.

The present invention may be implemented in many ways as a subsystem, a device or a method. According to one embodiment, the present invention is an optical apparatus comprising an optical filter configured to transmit a light signal at a selected wavelength, an isolator core, a first collimator receiving a light beam including signals respectively at a plurality of wavelengths including the selected wavelength, the collimator coupling the light beam to the optical filter through the isolator core, wherein the optical filter passes a substantial portion of the signal at the selected wavelength, and reflects a reflected light, the reflected light beam including the signals at the wavelengths other than the selected wavelength and a residual signal at the selected wavelength, wherein the isolator core is so positioned that the reflected light beam is stopped from going to the first collimator.

Depending on an exact implementation, the isolator core may be implemented by cascading a number of isolator cores and using multiple isolator cores housed in a single house.

One of the objects, features, advantages of the present invention is to provide a mechanism of high isolation for optical devices. The devices so designed are amenable to small footprint, broad operating wavelength range, enhanced impact performance, lower cost, and easier manufacturing process.

Other objects, features, and advantages of the present invention will become apparent upon examining the following detailed description of an embodiment thereof, taken in conjunction with the attached drawings

BRIEF DESCRIPTION OF THE DRAWINGS

These and other features, aspects, and advantages of the present invention will become better understood with regard to the following description, appended claims, and accompanying drawings where:

FIG. 1A shows a typical design of a three-port add/drop device;

FIG. 1B shows an exemplary internal configuration of the optical device of FIG. 1A;

FIG. 2B shows an internal configuration employing two three-port devices, such as the one of FIG. 1B;

DETAILED DESCRIPTION OF THE PREFERRED EMBODIMENT

Figure 2B:
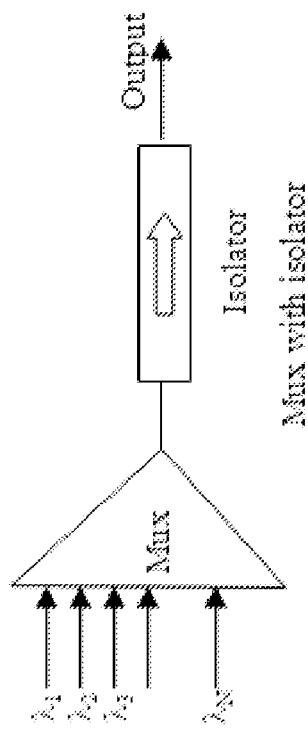
FIG. 2B shows that an isolator is disposed after a group of signals is multiplexed via a multiplexer.

The detailed description of the present invention is presented largely in terms of procedures, steps, logic blocks, processing, or other symbolic representations that directly or indirectly resemble the operations of optical devices or systems that can be used in optical networks. These descriptions and representations are typically used by those skilled in the art to most effectively convey the substance of their work to others skilled in the art.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments mutually exclusive of other embodiments.

Referring now to the drawings, in which like numerals refer to like parts throughout the several views. FIG. 3 shows an exemplary design 300 according to one embodiment of the present invention. One of the key features in the present invention is to provide an integrated optical device with multiplexing, demultiplexing, or adding or dropping function. As shown in the design 300, by introducing an isolator core 302, the optical device 300 achieves the same performance as those shown in FIG. 2A or FIG. 2B, but achieves a small footprint, broad operating wavelength range, enhanced impact performance, lower cost, and easier manufacturing process.

Figure 2A:
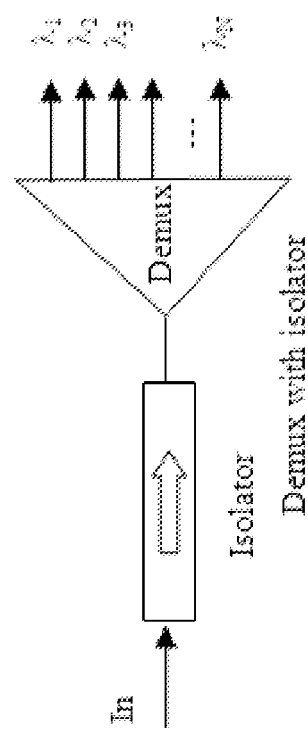
FIG. 2A shows that an isolator is inserted before a group of signals being coupled to a port of a demultiplexer.
Figure 3:
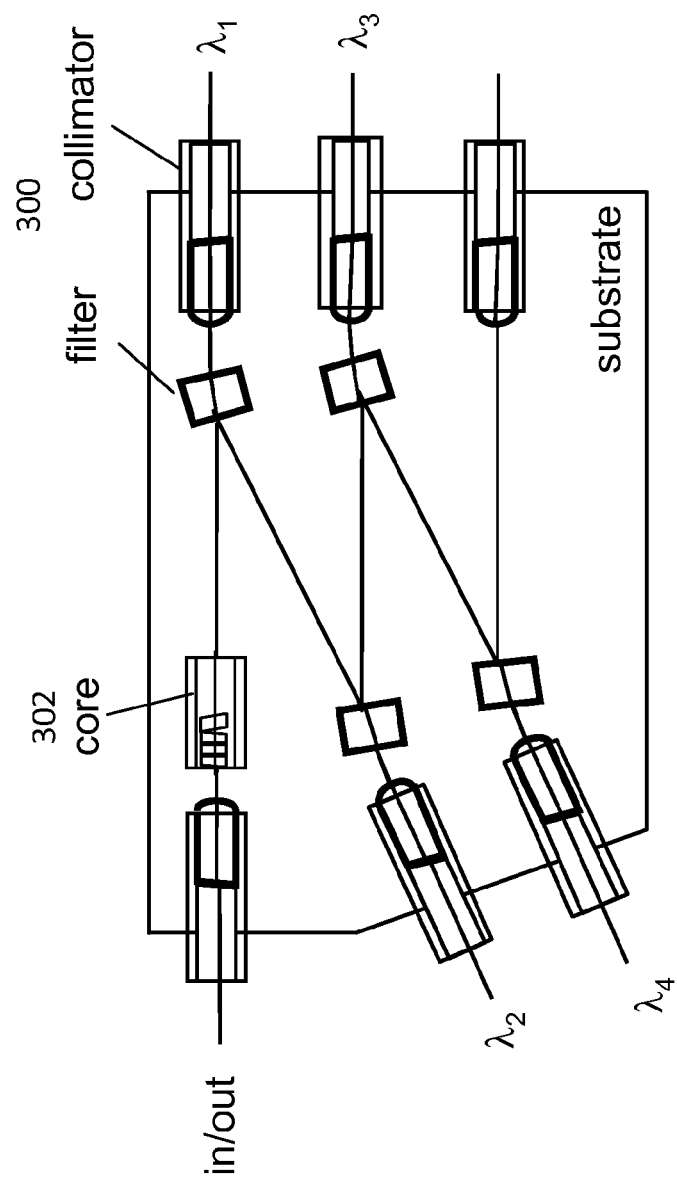
FIG. 3 shows an exemplary design according to one embodiment of the present invention.

It should be noted that an isolator core 302 as used in FIG. 3 is different from an isolator used in FIG. 2A or FIG. 2B in terms of costs, sizes and manufacturing process. As a standalone produce, the isolator of FIG. 2A or FIG. 2B needs a separate manufacturing process requiring assembling, packaging, and testing while the isolator core 302 does not need such a separate manufacturing process.

Figure 4B:
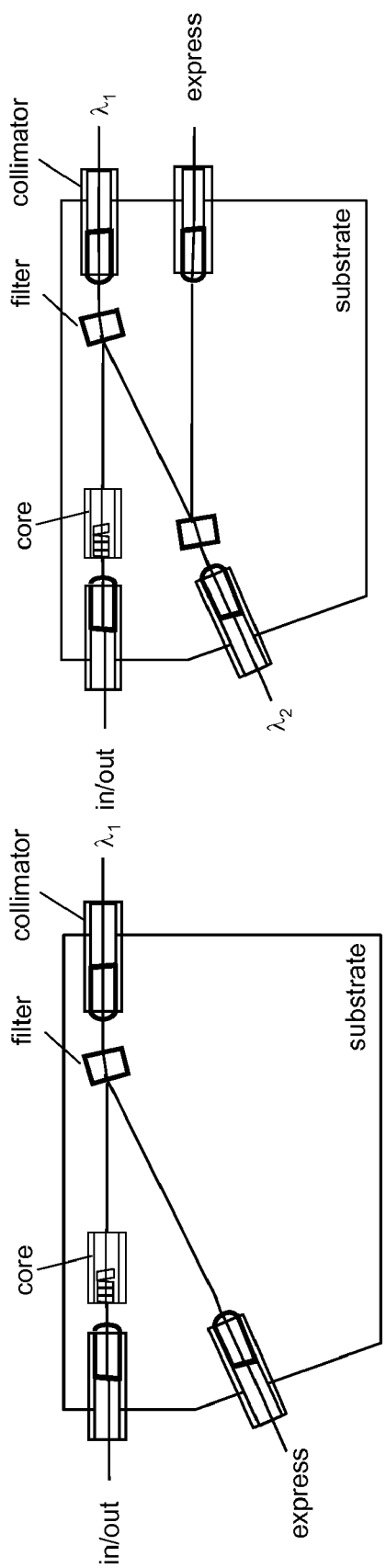
FIG. 4B shows a 2-channel WDM device.
Figure 4A:
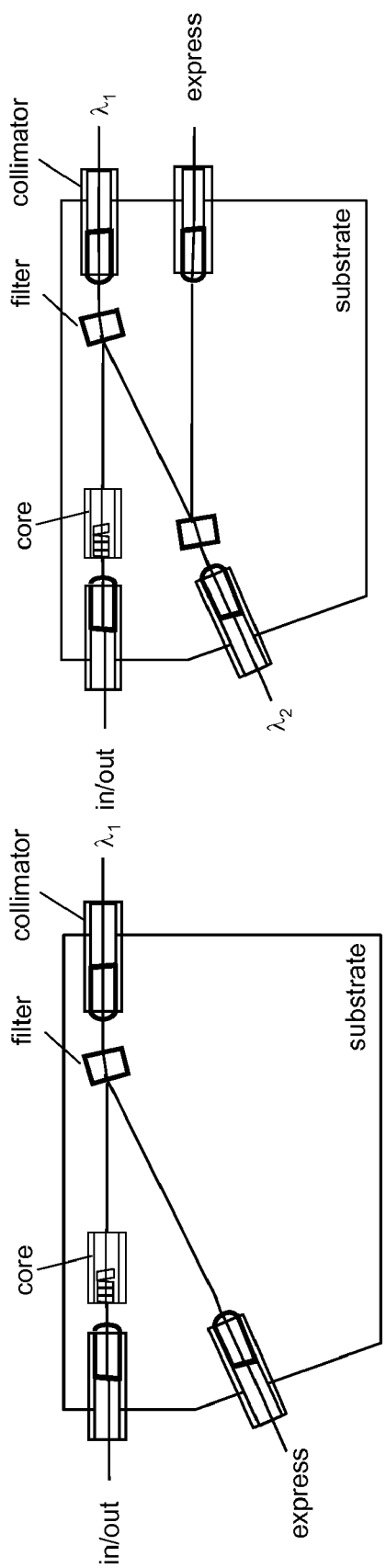
FIG. 4A shows that only one filter and one channel collimator are assembled as a one-channel WDM device.

According to one embodiment, the optical device 300 is a free-space zigzag WDM device, where fiber splices are replaced with beam relays. Each channel has one pair of collimators, resulting in low insertion loss. The channel count can be reconfigured by demand. For 1-channel device, besides common collimator, only one filter and one channel collimator are assembled as shown in FIG. 4A. For 2-channel, another set of filter and collimator is attached to the 1-channel configuration as shown in FIG. 4B. With this manner, the device is expandable depending on application. A 4-channel or 8-channel configuration is a common setup.

Figure 5B:
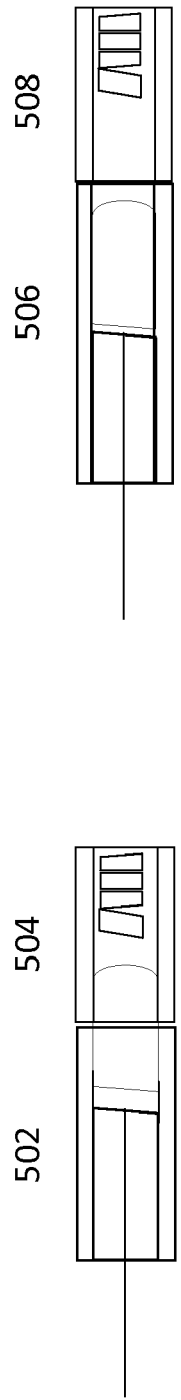
FIG. 5A and FIG. 5B each show an assembly of a collimator and an isolator core in different configurations.
Figure 5A:

FIG. 5A and FIG. 5B each show an assembly of a collimator 502 or 506 and an isolator core 504 or 508. FIG. 5A shows that the isolator core 504 is capped onto a lens in the collimator 502 while FIG. 5B shows that the isolator core 506 is integrated to the collimator 502 on the cross-section therebetween by a type of adhesive. It can be appreciated that the optical device with such a build-in isolator core benefits from low loss overhead, better space usage, and lower material cost.

Figure 6:
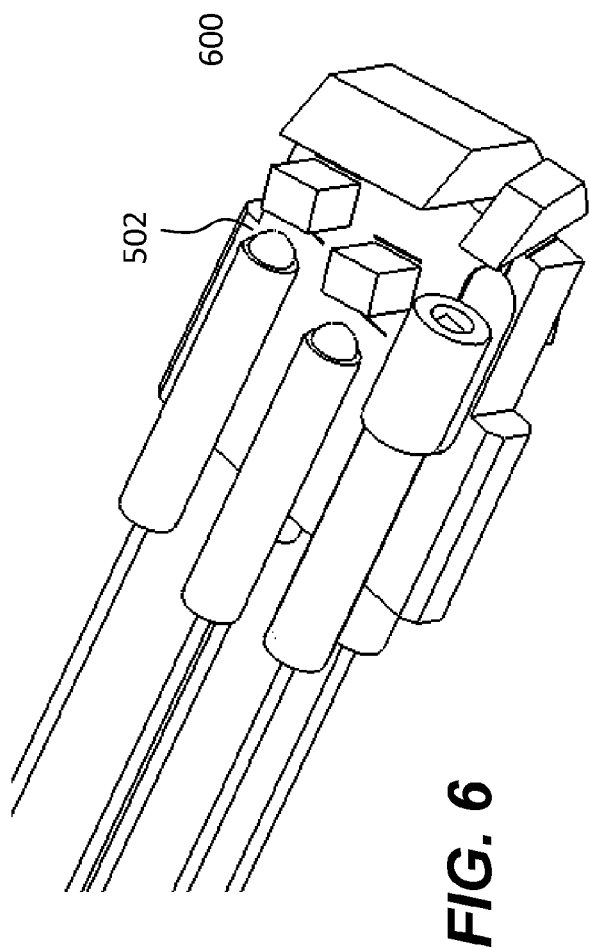
FIG. 6 shows a free-space WDM with isolator built-in according to another embodiment of the present invention.

FIG. 6 shows a free-space WDM 600 with isolator built-in according to another embodiment of the present invention. Collimators and filters are distributed on two sides of a substrate 602 by two prisms 604 and 606 for beam retro-reflection back and forth between the lower level and upper level of the substrate 602. The beam from a common collimator 608 on one side (e.g., the upper level) of substrate 602 first hits an isolator core 610, then is folded by the prism 606 to the other side (e.g., the lower level), then split by a thin film filter (not visible), through which an in-band signal passes then is coupled out by a collimator (not visible). While the rejection band signals are directed to the retro-reflecting prism 604 and folded to the upper level again. After several rounds of splitting by the filters (e.g., 612) and folded by the prism 604, the incoming signals are dropped to the separated ports. This layout results in a minimized space.

Figure 7B:
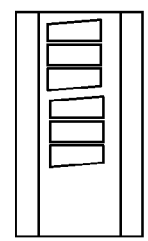
FIG. 7B shows an isolator core with an expanded isolation bandwidth using multiple-stage isolators.
Figure 7A:
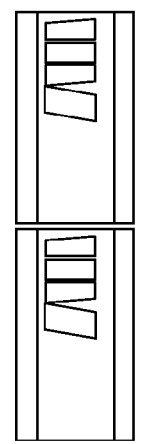
FIG. 7A shows an isolator core with an expanded isolation bandwidth by cascading multiple isolators.

An isolator core typically covers 40 nm wavelength range with reasonable backward isolation. To cover a broad band, two techniques may be are used: 1.) cascading of multiple isolators as shown in FIG. 7A; or 2.) multiple-stage isolators as shown in FIG. 7B. For various embodiments shown herein, a broad band can be realized by cascading of multiple cores or a multiple-stage core.

Figure 8:
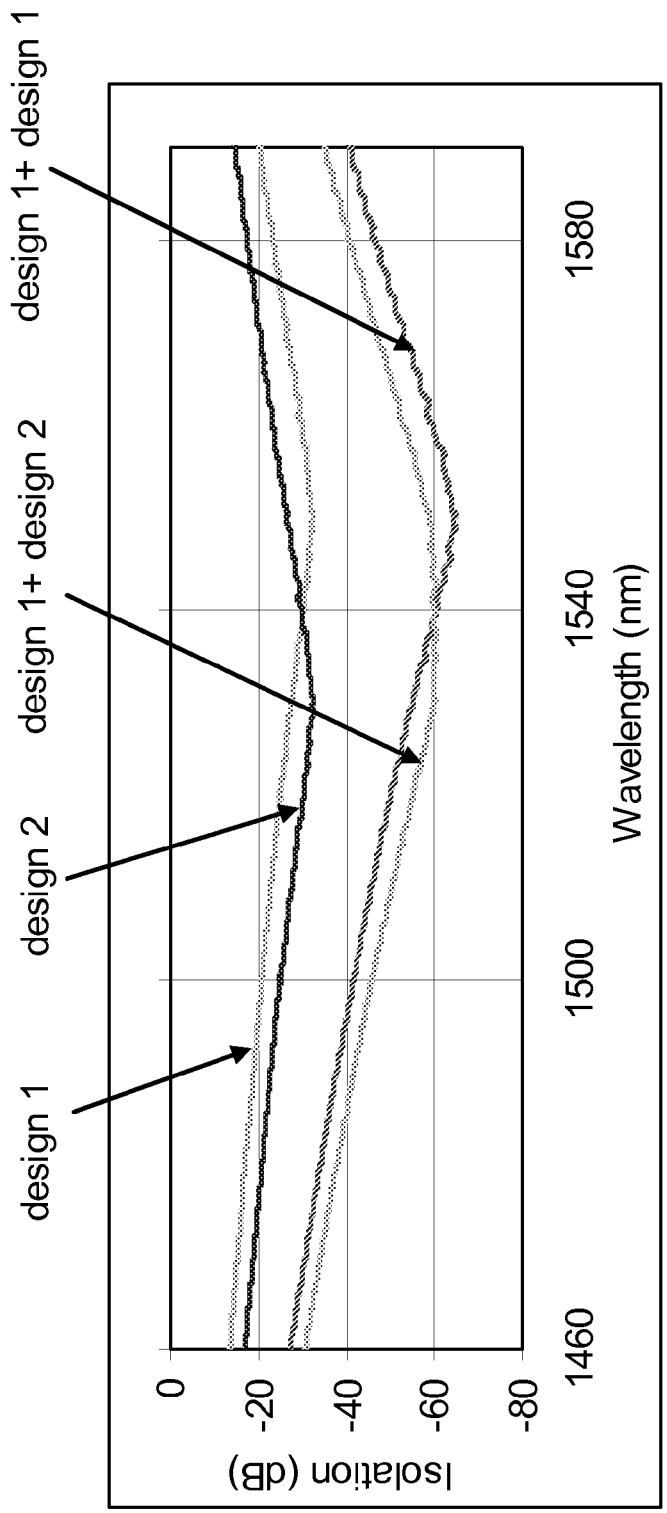
FIG. 8 demonstrates that two frequency responses using two identical and different isolation cores (core 1 centers at 1550 nm while core 2 centers at 1530 nm).

For each component in the cascaded cores or each stage of the core, there is a designed wavelength for each of the cores at which point the isolation reaches peak value. FIG. 8 demonstrates that core design 1 centers at 1550 nm while core design 2 centers at 1530 nm. For 1460~1590 nm wavelength range, the overall isolation level of either design is about 10 dB that may be insufficient for most applications. Two types of isolation additions are used to increase the isolation level: cascading design 2 after design 1 ("design 1+design 2"), or cascading two design 1 ("design 1+design 1"). For both manners, the isolation is lifted up to above 20 dB. As mentioned above regarding FIG. 7A and FIG. 7B, the isolation addition is realized by the cascading of multiple isolator cores or multiple stages in the same isolator core enclosure. The design of each core or isolator stage can be identical or different.

While the present invention has been described with reference to specific embodiments, the description is illustrative of the invention and is not to be construed as limiting the invention. Various modifications to the present invention can be made to the preferred embodiments by those skilled in the art without departing from the true spirit and scope of the invention as defined by the appended claim. Accordingly, the scope of the present invention is defined by the appended claims rather than the forgoing description of embodiments.

We claim:

1. An optical device comprising:
    an optical filter configured to transmit a light signal at a selected wavelength;
    an isolator core;
    a first collimator receiving a light beam including signals respectively at a plurality of wavelengths including the selected wavelength, the first collimator coupling the light beam to the optical filter through the isolator core, wherein the optical filter passes a substantial portion of the signal at the selected wavelength, and reflects a reflected light beam, the reflected light beam including the signals at the wavelengths other than the selected wavelength and a residual signal at the selected wavelength, wherein the isolator core is positioned between the optical filter and the first collimator, and adjusted with respect to the first collimator so that the reflected light beam is stopped from going to the first collimator.

2. The optical device of claim 1, wherein the isolator core is capped onto a lens of the first collimator.

3. The optical device of claim 1, wherein the isolator core is integrated with the first collimator by a type of adhesive at a cross section between the isolator core and the first collimator.

4. The optical device of claim 1, wherein the isolator core comprises multiple individual isolator cores cascaded or multiple isolator cores housed in a single house.

5. The optical device of claim 4, wherein each of the isolator cores are identical in terms of a designed isolation wavelength.

6. The optical device of claim 4, wherein each of the isolator cores are different in terms of a designed isolation wavelength so that an overall isolation wavelength bandwidth of the isolator core is expanded.

7. The optical device of claim 1, further comprising:
    one or more other collimators, each for one of the wavelengths, the collimators being disposed on both sides of a substrate; and
    one or two prisms to route a light beam from one side of the substrate to another side of the substrate.

8. A method for an optical apparatus, the method comprising:
    providing an optical filter configured to transmit a light signal at a selected wavelength;
    receiving from a first collimator a light beam including signals respectively at a plurality of wavelengths including the selected wavelength, the first collimator coupling the light beam through an isolator core to the optical filter that passes a substantial portion of the signal at the selected wavelength, the reflected light beam including the signals at the wavelengths other than the selected wavelength and a residual signal at the selected wavelength,
    wherein the isolator core is positioned between the optical filter and the first collimator, and adjusted with respect to the first collimator so that the reflected light beam is stopped from going to the first collimator; and
    wherein the isolator core is also integrated in the optical apparatus.

9. The method of claim 8, wherein the isolator core is capped onto a lens of the first collimator.

10. The method of claim 8, wherein the isolator core is integrated with the first collimator by a type of adhesive at a cross section between the isolator core and the first collimator.

11. The method of claim 8, wherein the isolator core comprises multiple individual isolator cores cascaded or multiple isolator cores housed in a single house.

12. The method of claim 8, wherein each of the isolator cores are identical in terms of a designed isolation wavelength.

13. The method of claim 8, wherein each of the isolator cores are different in terms of a designed isolation wavelength so that an overall isolation wavelength bandwidth of the isolator core is expanded.

14. The method of claim 8, further comprising:
    one or more other collimators, each for one of the wavelengths, the collimators being disposed on both sides of a substrate; and
    one or two prisms to route a light beam from one side of the substrate to another side of the substrate.

* * * * *